Jan. 29, 1957   R. E. FIDLER   2,779,093
METHOD OF MAKING JOINT SOCKET AND TUBE ASSEMBLIES
Filed May 27, 1953
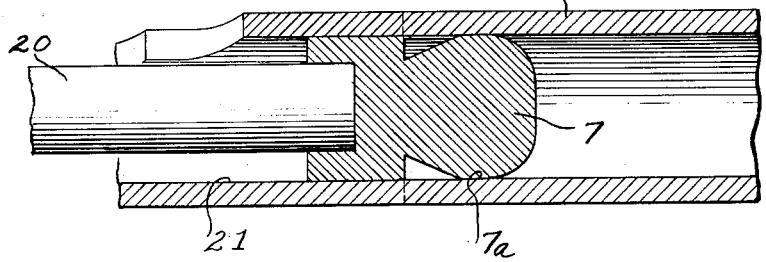
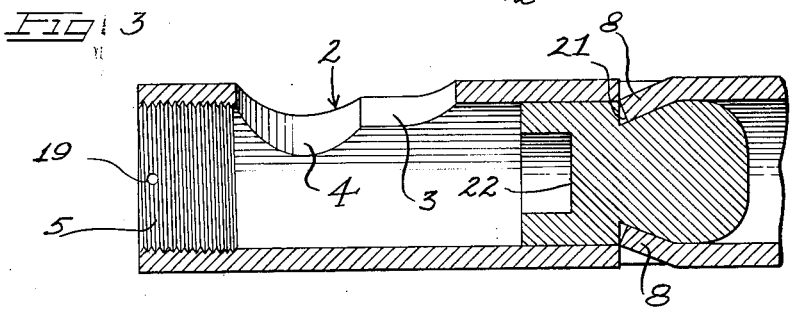
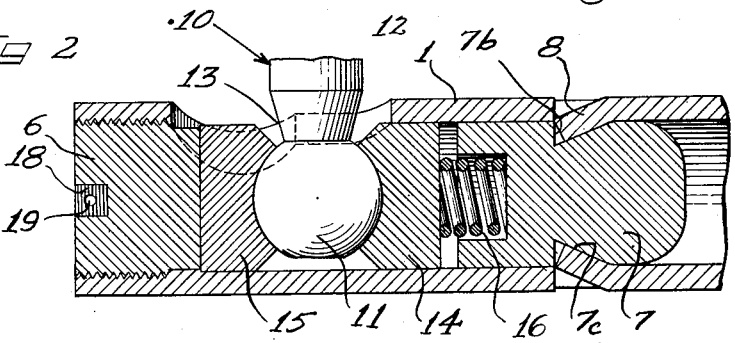
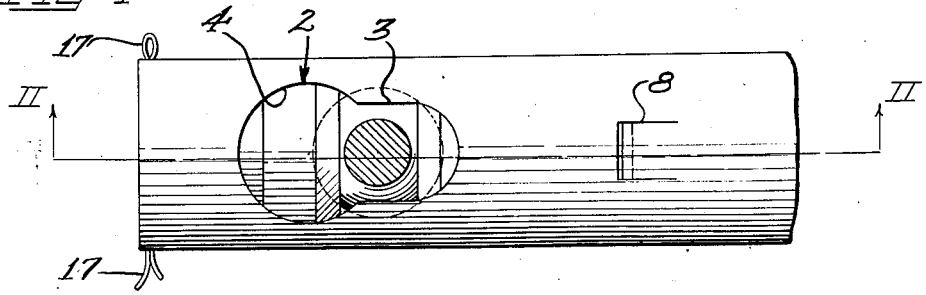
Inventor
Robert E. Fidler
By Hill, Sherman, Meroni, Gross & Simpson Attys United States Patent Office 2,779,093
Patented Jan. 29, 1957

2,779,093

METHOD OF MAKING JOINT SOCKET AND TUBE ASSEMBLIES

Robert E. Fidler, Royal Oak, Mich., assignor to Thompson Products, Inc., Cleveland, Ohio, a corporation of Ohio Application May 27, 1953, Serial No. 357,663

3 Claims. (Cl. 29—441)

The present invention relates to ball joint sockets and method of more expeditiously manufacturing them. More specifically, the invention relates to the manufacture of a ball joint socket from hollow steel tubing in such a manner as to materially reduce the manufacturing and assembly cost thereof.

I am, of course, aware of the fact that ball joint housings, or sockets, have been made from hollow steel tubing. In the manufacture of these housings, however, the techniques employed have proved relatively expensive.

For example, certain of the prior art structures have utilized steel tubing which is expanded at its ends to form the ball joint housing. This expansion was necessary to provide abutment shoulders within the tubing against which to position the ball joint parts in the assembly thereof. It is absolutely essential in order to provide the required safety of the ball joint, that the abutment shoulders be positively and rigidly secured within the tube and, hence, it has been common practice to upset the end of the tube to provide such shoulders. This upsetting is generally done in a heated stage and has thus proved relatively expensive.

In the prior art constructions, discussed above, it is necessary to size the inside diameter of the upset, or enlarged, portion of the tube in which the ball joint components are assembled. This sizing operation is a final step in the manufacture of the tube and is necessary to accurately dimension the inside diameter of the ball joint housing so that the various ball joint bearing surfaces will be free to move therein under operational loads. In the prior art constructions of which I am aware, this sizing operation has been performed in a hot state and by means of relatively expensive dies. Further, the sizing operation has added expense to the finished item since it entails a separate operation while the tubing it hot.

By means of the novel process and ball joint parts of the present invention, the steps of sizing and providing the necessary abutment for the tubular housing are now accomplished in a single step. The steel tubing is also no longer upset and, hence, all operations required in the manufacture of the ball joint housing may be carried out while the tubing is in a cold state and without expensive upsetting dies.

It is, therefore, an object of the present invention to provide a novel method of manufacturing a ball joint housing.

Another object of the present invention is to provide a method of providing an abutment in a tubular ball joint housing while simultaneously internally sizing the housing.

Still a further object of the present invention is to provide an externally inexpensive method of ball joint manufacture by which a ball joint assembly may be completely manufactured with the parts in a cold condition.

A feature of the present invention is the use of a combined sizing dye and abutment which may be utilized for sizing and subsequently left in the housing as a permanent abutment member.

Another feature of the present invention is the provision of a two-way abutment stop means which positively prevents movement of the abutment in either direction after its assembly in the ball joint housing tube.

Still other objects and features will become at once apparent to those skilled in the art from a consideration of the attached drawings in which a preferred embodiment of the present invention is shown by way of illustration only.

On the drawings:

Figure 1 is a plan view showing the assembled ball joint constructed according to the present invention;

Figure 2 is a cross sectional view in elevation taken along the lines II—II of Figure 1;

Figure 3 is a cross sectional view taken along the lines II—II of Figure 1 showing the ball joint in an incomplete state of assembly; and Figure 4 is a cross sectional view of the tubular housing showing the combined sizing die and abutment member immediately after the sizing operation.

As shown on the drawings:

A ball joint, constructed according to the present invention, comprises a generally tubular housing 1 which may be, for example, a tie rod, a drag link, or other similar connecting link.

Adjacent the left hand end of the tube, as viewed in Figures 1 through 4, a keyhole-shaped aperture 2 is provided having a reduced portion 3 and an enlarged circular portion 4. The left end of the tube is threaded as at 5 for the insertion of a threaded end plug 6. To prevent movement of the joint parts relative to the tube 1, an abutment member 7 is positioned adjacent the small portion 3 of the keyhole slot 2 and is maintained in position by a plurality of pierced fingers 8 which are struck inwardly from the body of the tube 1. A conventional ball stud 10 having a ball portion 11, a shank portion 12 and a necked down intermediate portion 13 is positioned between a pair of ball sockets 14 and 15 located between the plug 6 and the abutment 7.

In order to provide resiliency for shock absorbing purposes and to aid in the assembly of the device, a spring 16 is positioned between the abutment 7 and the bearing support 14 and urges the socket 14 toward the left. The entire assembly is maintained in its assembled condition by means of a cotter key 17 passing through the notch 18 in the plug 6 and the holes 19 in the tubular body member 1.

While the use of a key hole slot, such as at 2, and bearings 14 and 15 in the combination with a stud, such as shown at 10, is conventional, a consideration of Figures 3 and 4 will clearly show the novel features of the ball joint housing herein claimed.

As may be seen from Figure 4, the abutment 7 is forced into the tubular housing 1 from the left hand end. The abutment 7 is manufactured with an outside diameter at the point 7a which is slightly larger than the inside diameter of the tube, and when forced into the tube by means of the removable driver 20, it expands the inside surface of the tube to the finished diameter, removing all machining burrs or other similar surface irregularities. In view of the fact that threads 5 and the keyhole slot 2 have already been machined in the tube 1, this final sizing operation places the housing in condition for receiving the accurately machined bearings 14 and 15 and the screw plug 6.

As explained before, the practice in the prior art was to utilize a sizing die which was inserted and then removed, or, in the alternative, to ream, by the use of conventional rotating reamers, the inside diameter of the tubing to its final finished size. By utilizing an abutment of the type shown in Figure 7, which not only serves as an abutment in the finished article, but also as a sizing die, the added steps of removing the sizing die and inserting an abutment member are completely eliminated. This is an important advantage in the field of automotive parts since a small fraction of the cent may well mean the difference between a commercially practicable device and one which is unacceptable.

When the abutment has reached a position in the tube as shown in Figure 4, the fingers 8 are pierced inwardly by means of apparatus not shown. These fingers 8, which assume the position shown in Figures 2 and 3, positively prevent the abutment 7 from moving toward the right since the ends 21 abut the shoulder 7b of the abutment member. Likewise, movement of the abutment 7 toward the left is prevented by the gripping of the fingers 8 against the necked down portion 7c of the abutment. The driver 20 may then be removed from the recess 22 in the abutment and the remainder of the ball joint parts assembled to the tubular housing.

While only two fingers 8 have been shown in the drawings, it is, of course, contemplated that any number of such abutments could be utilized. The only limitations governing the number of fingers are the strength limitations and the equalization of the loads applied to the abutment. It has been found that the use of three or four fingers 8 is satisfactory from both of these considerations since in either case, the load applied to the abutment 7 is distributed over abutments lying in more than one radial plane and since, further, in either case, insufficient material has been removed from the tube to bring the structure below its overall strength requirements.

By the use of the structure above described, an extremely simple and inexpensive ball joint housing structure is provided. This structure may be manufactured from a straight length of tubing without the necessity of shaping the tubing under high temperatures or pressures and, by utilizing a combined abutment member and finished sizing die, a complete finishing step has been eliminated. Further, by utilizing cold piercing, further hot forging steps of the fingers 8 is eliminated.

While the abutment 7 may be manufactured of a relatively high quality material such as high carbon steel, it has been found that low carbon steel is satisfactory for the purposes herein involved, since the sizing operation is performed only once in the lifetime of the housing and, hence, the wear which would necessarily be found in the abutment 7 upon repeated usage is reduced to a negligible amount. By the use of such a relatively inexpensive material in place of the extremely expensive dies normally used for sizing, applicant has also provided a further economy over the prior art.

It will thus be seen that I have provided a novel ball joint housing constructed of simple tubing without the addition of heat, high pressures, or other expensive operations usually associated with the manufacture of tie rod or drag link ball joint housings.

It is understood that modifications and variations may be made in the above described method and construction without departing from the novel concepts of the present invention and it is, therefore, not desired to limit the invention except as required by the appended claims.

I claim as my invention:

1. The method of constructing a ball joint housing which comprises machining a lateral opening in a tube having a rough internal surface, forcing an abutment member into the tube in a position beyond said lateral opening, said abutment member having a reduced neck portion, a cylindrical portion of a diameter slightly larger than the rough internal surface of the tube and a smooth surface to smooth the inner surface of the tube as said member is forced into position, and deflecting the metal of said tube inwardly at points around the periphery thereof into engagement with said reduced neck portion of said member whereby said member is permanently retained in said tube as an abutment.

2. The method of constructing a ball joint housing which comprises machining a lateral opening in a tube, threading an end of said tube adjacent to the lateral opening, forcing an abutment member into the tube in a position beyond said lateral opening, said abutment member having a reduced neck portion and a cylindrical portion of a diameter slightly larger than the internal diameter of the tube and a smooth surface to smooth the inner surface of the tube as said member is forced into position, deflecting the metal of the tube inwardly at points around the periphery thereof into engagement with the reduced neck portion of said member, and withdrawing the tool by which said member was forced into the tube, leaving the member as a permanent abutment in the tube.

3. The method of manufacturing a ball joint housing from a length of tubing having a rough internal surface which comprises machining a lateral aperture in the tube adjacent one end thereof, forcing an abutment member into the tube in a position beyond said lateral aperture, said abutment member having a reduced neck portion and a cylindrical portion of a diameter slightly larger than the rough internal surface of said tube and a smooth surface to smooth the inner surface of the tube as said member is forced into position in the tube, cold working the material of the tube into the reduced neck portion of the abutment member, and removing the apparatus utilized in forcing the member into the tube, leaving the member permanently in position in the tube.

References Cited in the file of this patent

UNITED STATES PATENTS

| | | |
|---|---|---|
| 1,199,048 | Breeze | Sept. 26, 1916 |
| 1,401,110 | Kaps | Dec. 20, 1921 |
| 1,537,529 | Enberg | May 12, 1925 |
| 1,625,795 | Crawford | Apr. 26, 1927 |
| 1,740,971 | Corlett | Dec. 24, 1929 |
| 1,775,055 | Tarbox | Sept. 2, 1930 |
| 2,025,727 | Crawford | Dec. 31, 1935 |
| 2,499,241 | Courtot | Feb. 28, 1950 |
| 2,542,376 | Torresen | Feb. 20, 1951 |